(12) United States Patent
Galik

(10) Patent No.: US 8,096,729 B2
(45) Date of Patent: Jan. 17, 2012

(54) WHEEL ADJUSTMENT APPARATUS

(76) Inventor: Christopher Galik, Palos Hills, IL (US)

( * ) Notice: Subject to any disclaimer, the term of this patent is extended or adjusted under 35 U.S.C. 154(b) by 248 days.

(21) Appl. No.: 12/490,080

(22) Filed: Jun. 23, 2009

(65) Prior Publication Data

US 2010/0322715 A1     Dec. 23, 2010

(51) Int. Cl.
*B63C 3/06*     (2006.01)
(52) U.S. Cl. .................... 405/3; 114/44; 280/414.1
(58) Field of Classification Search ............. 405/3, 221; 114/44; 187/267; 16/33; 254/96, 254; 280/414.1
See application file for complete search history.

(56) References Cited

U.S. PATENT DOCUMENTS

| | | | |
|---|---|---|---|
| 2,952,473 A * | 9/1960 | Legge ................... | 280/6.153 |
| 4,318,632 A | 3/1982 | Fortmeyer | |
| 5,224,569 A | 7/1993 | Hewitt et al. | |
| 5,562,362 A | 10/1996 | Vezner | |
| 5,687,663 A | 11/1997 | Wahlstrand | |
| 6,361,252 B1 | 3/2002 | Leitheiser | |
| 6,520,102 B1 | 2/2003 | Johnson | |
| 2007/0252123 A1* | 11/2007 | Derner ................. | 254/424 |
| 2009/0080974 A1 | 3/2009 | Krause | |

* cited by examiner

*Primary Examiner* — David Bagnell
*Assistant Examiner* — Benjamin Fiorello
(74) *Attorney, Agent, or Firm* — Beem Patent Law Firm

(57) ABSTRACT

An adjustable lift, such as a boat lift, or an adjustable apparatus mountable to a boat lift, comprising a frame supporting a keyway, a shaft and a screw along which a hub assembly travels. An axle may extend from the hub assembly and support a wheel, such that translation of the hub assembly along screw raises and lowers the wheel with respect to the frame members of the lift. In this way, the lift may be rolled into place, with its wheels then raised, so that frame members and/or feet of the lift rest on a lake bed or other surface. When wanting to move the lift, a user may rotate the screw in an opposite direction, lowering the wheel with respect to the frame member, freeing lift frame members and feet from the lake bed and allowing the user to roll the lift away.

19 Claims, 4 Drawing Sheets

WHEEL ADJUSTMENT APPARATUS

BACKGROUND OF THE INVENTION

1. Field of the Invention

The present invention is directed to an apparatus for adjusting the height of a wheel relative to a frame member, for example, for adjusting the height of a wheel used to transport a boat lift.

2. Description of the Related Art

Boat lifts, specifically lake lifts, are used to hold and dock boats in relatively shallow waters so as to elevate the boat hull from the lake bed when not in use. In certain geographies, such as those where at least a portion of the water may freeze in the winter, these lifts generally need to be removed in order to prevent ice damage. In addition, lifts may be removed at other times, e.g., to be cleaned or to be moved for use at another location.

Lake lifts often have a plurality of frame members that form a generally rectangular base with feet at each of the corners. Lifts of this variety are difficult to position on a lake bed, and they often are even more difficult to remove because the feet or the frame members embed themselves in the lake bed. Weighing several hundred pounds, a lift typically needs to be dragged onshore using vehicles or significant manpower.

In an effort to alleviate these issues, attempts have been made to attach wheels to the lift. The wheels allow the lift to roll, thereby decreasing the force required to place the lift in, and then later remove it from, the water. Many of these wheels come in the form of aftermarket kits that may be mounted to the lifts. The wheels may be left on during the duration of a boating season or removed after installation. In the latter case, the lift must be raised in the water to reattach the wheels, again requiring the user to exert large forces to move the lift. In the former case, the wheels that stay attached to the frame may sink into the lake bed, which often is a loose material such as sand or pebbles. Here, the wheels may get stuck in the lake bed, again making removal of the lift difficult.

What is needed is an apparatus that overcomes the drawbacks described above.

BRIEF SUMMARY OF THE INVENTION

In one aspect of the invention, an apparatus for adjusting the height of a wheel relative to a frame member, comprising a frame having a base, a first support and a second support; a screw extending between the first and second supports, the screw rotatable with respect to the frame, the screw having an end with torque transmitting surfaces for rotating the screw; a hub assembly slidably coupled to the screw; and an axle coupleable to the hub for mounting a tire to the apparatus. The apparatus further may include a shaft and a keyway coupled to the base and extending between the first and second supports, wherein the hub assembly is slidable with respect to the shaft and keyway. In addition, the apparatus may include a bushing in at least one of said first and second supports, wherein said screw rotatably engages said bushing. The hub assembly may include a hub and a spindle, the hub having a first bore for receiving the screw and a second bore for receiving the spindle, and the spindle may include a bore for receiving the screw.

Additionally, the apparatus may include a mounting plate spaced from the frame. The mounting plate may have a plurality of openings for receiving a first plurality of fasteners and a second plurality of openings for receiving a second plurality of fasteners. Moreover, the first and second pluralities of fasteners may removably couple to the base for mounting to the frame member.

In another aspect of the invention, an apparatus for adjusting the height of a wheel mounted to a frame member of a boat lift, comprising: a base having a first support and a second support extending generally normal to the base, the base having a plurality of pairs of openings substantially evenly spaced proximate opposite sides of the base; a keyway and a shaft extending between the first and second supports along a central plane of the base; a screw spaced from the shaft and extending between the first and second supports along a central plane of the base; a hub assembly slidably engaged with the keyway, the shaft, and the screw; the hub assembly including a hub and a spindle at least partially embedded in the hub; the hub assembly further including a protrusion and a recess at an end of the hub for coupling an axle to the hub assembly; and a mounting plate spaced from the base for mounting the frame member between the base and mounting plate. Moreover, the apparatus may include a plurality of pairs of openings proximate opposing sides of the mounting plate; and a plurality of fasteners having shanks sized to pass through the plurality of pairs of openings in the mounting plate and through a respective plurality of pairs of openings in the base.

The lift apparatus further may include a tire rotatably coupled to the axle, and the tire may have a width substantially equal to a length of the axle or one of a plurality of predetermined sizes smaller than the length of the axle. In addition, the screw may have at least one generally cylindrical portion for engaging a bushing mounted in one of the first and second supports, and at least one generally hexagonal portion having torque transmitting surfaces for rotating the screw.

In still another aspect of the invention, a boat lift comprising: a frame having a plurality of lift frame members, including a plurality of generally parallel members; a plurality of wheel frames coupled to the frame, wherein at least one wheel frame is coupled to one of the generally parallel members and at least a second wheel frame is coupled to a second one of the generally parallel members. Each of the wheel frames may include a screw operatively coupled to a hub assembly, and each hub assembly may be coupled to an axle supporting a wheel, wherein rotating the screw, e.g., by engagement with a torque transmitting tool, changes a height of a respective wheel relative to a respective wheel frame. In addition, each of said wheel frames may include a shaft and keyway, said hub assembly slidable along said shaft and keyway. Moreover, each of the wheel frames may have a base and a plurality of supports extending generally normal to the base, wherein each of the wheel frames may include a shaft fixedly coupled to the base and plurality of supports, the hub assembly slidable along the shaft.

These and other features and advantages are evident from the following description of the present invention, with reference to the accompanying drawings.

DETAILED DESCRIPTION

Figure 1:
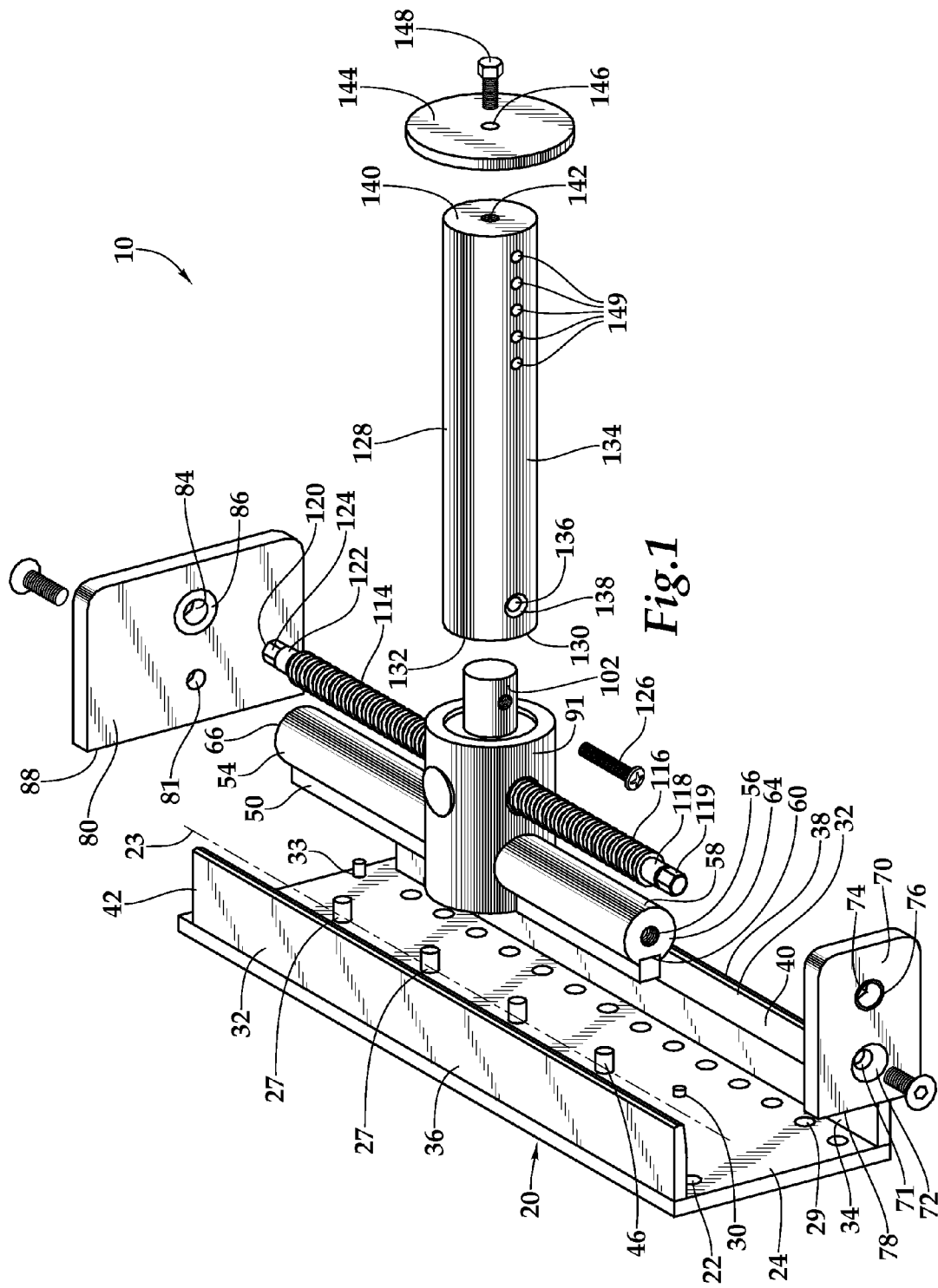
FIG. 1 is an exploded view of one embodiment of a wheel-height adjustable apparatus according to the present invention.

As seen in FIG. 1, an adjustable apparatus 10 mountable to a lift 2, such as a boat lift, may comprise a frame 20 having a base 22 with a first support 70 and second support 80 supporting a keyway 50, a shaft 54 and a screw 114 along which a hub assembly 90 travels. An axle 128 extends from hub assembly 90 and supports a wheel 6, such that translation of hub assembly 90 along screw 114 raises and lowers wheel 6 with respect to the frame members 4 of lift 2. In this way, lift 2 may be rolled into place with wheels 6 then raised so that frame members 4 and/or feet 5 of lift 2 rest on a lake bed or other surface. When wanting to move lift 2, a user may rotate screw 114 in an opposite direction, lowering wheel 6 with respect to frame member 4, freeing frame members 4 and feet 5 from lake bed, and allowing the user to roll lift 2 away.

Apparatus 10 may include a frame 20 comprising a base 22 having inner surface 24 and outer surface 26. Base 22 may be generally rectangular, and inner surface 24 and outer surface 26 may be generally parallel. Base 22 also may be generally symmetrical about a central plane 23. In addition, base 22 may include a plurality of arms 32 extending away from base 22, each to a distal end 38, although, in another embodiment, base 22 may not include arms.

In one embodiment, arms 32 each may have an inner surface 34 and an outer surface 36 and further may have a taper 40 along inner surface 34 towards distal end 38. Taper may be between about 3 degrees and about 20 degrees, preferably between about 5 degrees and about 15 degrees, still more preferably between about 5 degrees and about 10 degrees, and in one embodiment, about 6.5 degrees. In another embodiment, arms may not include a taper, and inner surface 34 may be generally parallel to outer surface 36

Staying with FIG. 1, base 22 may have a plurality of first openings 27 generally aligned with central plane 23. Openings 27 may admit passage of fasteners 46 for securing keyway 50 and shaft 54 to frame 20. Base 22 may include between about two and about eight generally equidistantly spaced openings, preferably between about three and about six openings, and in one embodiment, about four openings. In addition, openings 27 may include chamfers 28 to countersink fasteners 46, thereby allowing heads of fasteners 46 to seat at or below outer surface 26. Chamfer 28 may be angled at about the same angle as the underside of the head of fastener 46 to aid in seating and engagement of fastener 46.

Base 22 further may include a plurality of second openings 29 generally symmetrical about central plane 23, proximate arms Second openings 29 may allow for passage of mounting fasteners 168 to fasten mounting plate 150 to base 22, and to fasten apparatus 10 to boat lift 2, as discussed below. Base 22 may include multiple pairs of second openings 29 to enable a user to mount apparatus 10 to lifts having frame members 4 of varying heights. Base 22 may include between about two pairs and about 16 pairs of second openings 29, preferably between about four pairs and about fourteen pairs, still more preferably between about eight pairs and about twelve pairs, and in one embodiment, about 11 pairs of second openings 29.

Still with FIG. 1, apparatus 10 may include a plurality of supports, including first support 70 and second support 80. First support 70 may have a width less than the width between inner surfaces 34 of arms 32, which may provide clearance between first support 70 and arms 32 for passage of mounting fasteners 168 and may require less material than if first support 70 spanned the width between arms 32. In one embodiment, base 22 may include third openings 30 for fastening first support 70 to base 22 so that lower edge 78 engages inner surface 24. As with first openings 27, third openings 30 each may include a chamfer 31 to allow heads of fasteners to seat flush with outer surface 26 of base 22.

Second support 80 may resemble first support 70. However, second support 80 may have a width substantially equal to the width of base 22 or to the width between inner surfaces 34 of arms 32. As with first support 70, lower edge 88 of second support 80 may engage inner surface 24. In order to accommodate second support 80, arms 32 may not extend a length of base 22 but instead may stop short, forming edges 42 against which second support 80 may abut and shelf 44 against which lower edge 88 may bear. Like third openings 30, base 22 may include fourth openings 33 substantially symmetrical about central plane 23, and fourth openings 33 may include similar chamfers 35.

Figures 3, 4:
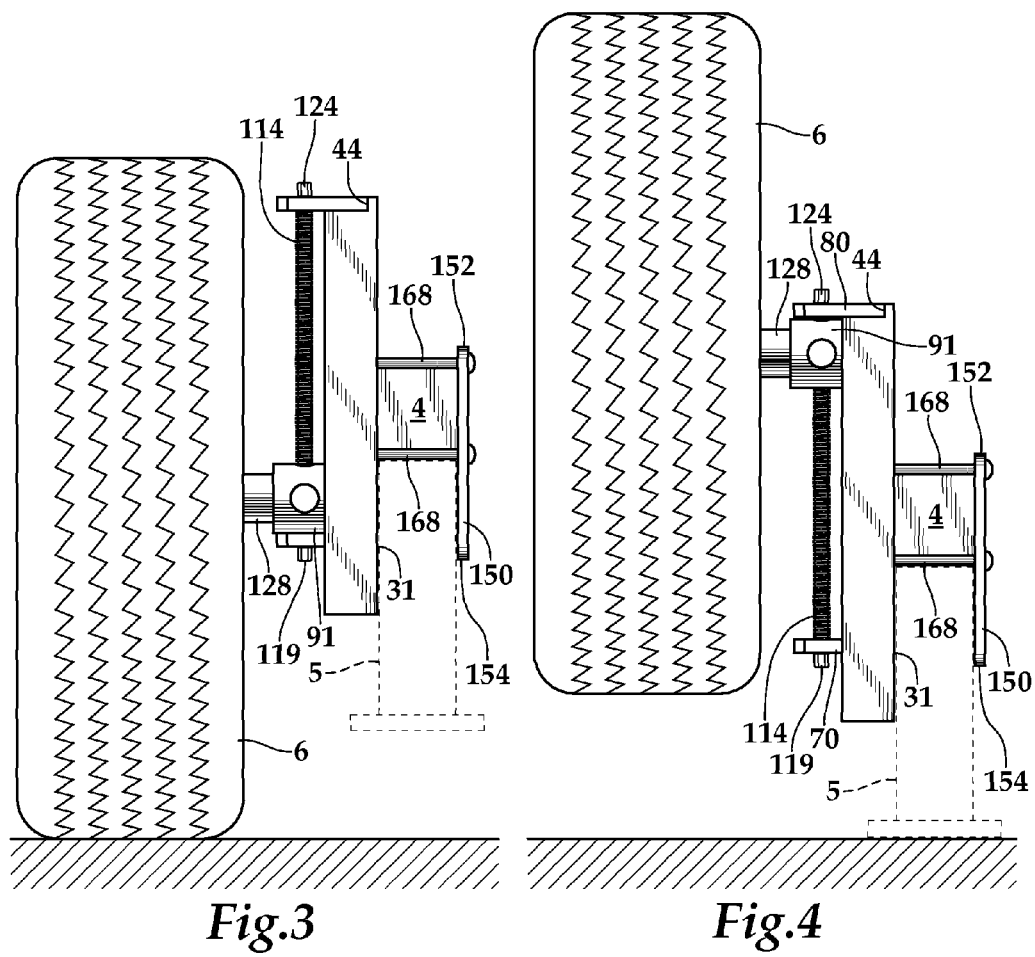
FIG. 3 is a front view of the apparatus of FIG. 1 in a lowered-wheel position.
FIG. 4 is a front view of the apparatus of FIG. 1 in a raised-wheel position.

In another embodiment, one or more of first support 70 and second support 80 may be integrally formed with base 22. In addition, one or both of first support 70 and second support 80 may be located proximate ends of base 22. Alternatively, one or both of first and second supports may be spaced inward from ends of base 22, e.g., as seen with first support 70 in FIGS. 3 and 4. This may allow for base 22 to be longer, e.g., between about 14" and about 24", preferably between about 15" and about 20", and in one embodiment, about 17". This additional length may allow a user to install base 22 on a larger variety of boat lift members 4 and also may make apparatus 10 functional even if installed upside-down.

As seen in FIG. 1, apparatus 10 may include keyway 50 and shaft 54 between first and second support. Keyway 50 may have a generally rectangular cross-section, with one side lying generally flush against inner surface 24. An opposing side and portions of the other sides of keyway 50 may lay generally flush against notch 60 formed inward from outer surface 58 of shaft 54.

Keyway 50 and shaft 54 may engage base 22 substantially along central plane 23. In addition, keyway 50 may have a plurality of openings 52 along its length, and shaft 54 may have a substantially similar number of openings 62 along its length, with openings 52 aligned with openings 62. Openings 52 may extend through keyway 50, while openings 62 may extend only partially through shaft 54.

Shaft 54 may include bore 56 for receiving fasteners to secure first and second supports. In one embodiment, bore 56 may extend along the length of shaft 54. Preferably, however, bore 56 comprises two recesses, one at each end surface 64, 66 of shaft 54, each recess sized and threaded to receive fasteners. First support 70 may include first opening 71 for receiving fastener to join first support 70 with shaft 54 at first end surface 64, and first opening 71 may include chamfer 72 for seating of fastener head. Similarly, second support 80 may include first opening 81 for receiving fastener to join second support 80 with shaft 54 at second end surface 66, and second opening 81 may include chamfer 82.

Apparatus 10 may include a hub assembly 90 slidable between first support 70 and second support 80. In the embodiment shown in FIG. 5, hub assembly 90 may include a hub 91 that is generally cylindrical, but hub 91 may have other configurations.

Figure 5:
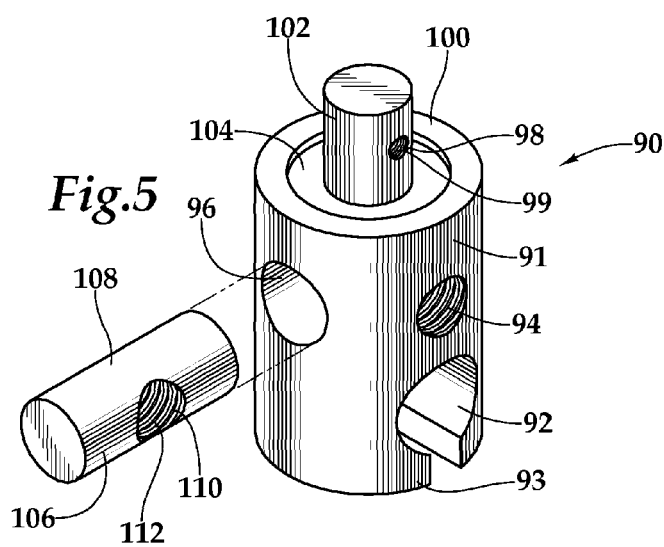
FIG. 5 is an exploded view of one embodiment of a hub assembly.

Staying with FIG. 5, hub 91 may include channel 92 proximate a lower end 93 and having a cross-section resembling the cross-section of keyway 50 and shaft 54. Lower end 93 may be generally planar so as to allow hub assembly 90 to translate laterally along inner surface 24 of frame 20. Hub 91 may include a first bore 94 for receiving screw 114 (described below) with first bore 94 extending through hub 91 generally parallel to channel 92.

Hub 91 also may include a second bore 96 extending through hub 91, with second bore 96 generally normal to first bore 94. Second bore 96 may be sized to receive spindle 106, preferably via an interference fit to maintain outer surface 108 of spindle 106 in contact with second bore 96. Spindle 106 may include a bore 110 of its own, similarly sized with respect to first bore 94. In addition, bore 110 may have interior threading 112, preferably female threading, for engaging exterior threading 116 of screw 114. Preferably, first bore 94 may have interior threading similar to threading 112 on spindle 106. In another embodiment, however, first bore 94 is unthreaded and sized to have a diameter slightly larger than major diameter of screw 114. In still another embodiment, hub 91 may not include second bore, hub assembly 90 may not include spindle 106, and first bore 94 may include threading adapted for threadingly engaging screw 114.

First support 70 may include second opening 74 to receive first end 118 of screw 114. First end 118 should fit securely in second opening 74 but still permit smooth rotation of screw 114, which may be accomplished by installing bushing 76 in second opening 74. Similarly, generally cylindrical portion 122 of second end 120 should fit securely in second opening 84 of second support 80, which may be accomplished with bushing 86. Second end 120 of screw 114 extends beyond second support 80 to provide at least one torque transmitting surface to rotate screw 114. In one embodiment, second end 120 includes a generally hexagonal surface 124, e.g., a 7/16" hexagonal head, configured to receive a socket wrench or an extension from such a wrench. In addition, first end 118 may have a similar generally hexagonal surface 119 extending beyond first support 70. Generally hexagonal surface 119 may allow a user to operate apparatus 10 from either the top or bottom, or it may allow a user to install apparatus upside-down while still maintaining functionality.

Screw 114 may be, e.g., a ¾-6 (in.) ACME right hand screw. Additionally, screw 114 may be plated, e.g., chrome plated, to reduce friction and allow for improved operation.

Returning to FIG. 5, hub 91 may include end face 100 generally opposite from lower end 93. End face 100 may have protrusion 102 extending axially away therefrom for supporting axle 128 on which wheel 6 is mounted. Protrusion 102 may include opening 98 having interior threading 99, and axle 128 may have a corresponding opening 136 with chamfer 138, with both openings adapted to receive fastener 126 to couple axle 128 to hub 91. In addition, hub 91 may have a diameter greater than axle diameter and, as seen in FIG. 5, end face 100 of hub may include indentation 104 having a diameter generally equal to, or slightly larger than, axle diameter. This may allow first end 130 of axle 128 to countersink in indentation 104, strengthening engagement of axle 128 with hub 91.

Axle 128 further may include a second opening 142 generally axially aligned on second end 140. Second end may be generally flat to couple with washer 144, which may have a similar generally axially aligned opening 146, with both openings configured to receive fastener 148. Washer 144 may have a diameter larger than axle diameter and preferably larger than diameter of wheel hub 8 so that washer retains wheel 6 on axle 128 once installed.

Width of wheel 6, mounted on axle 128, may decrease pressure on ground by increasing contact surface area. In order to increase contact surface area, wheel 6 may have a width substantially equal to length of axle. Axle may vary in length, e.g., between about 5" and about 12", preferably between about 7" and about 10", and in one embodiment, about 8⅝". Exterior surface 134 of axle 128 may be substantially solid and uninterrupted to allow wheel 6 to extend along width of axle 128. In another embodiment, as seen in FIG. 1, the exterior surface may include one or more openings 149 extending through the axle surface. These openings 149 may be adapted to receive pins or other fasteners in order to restrict movement along axle 128 in the case of a wheel 6 having a width smaller than that of axle 128.

Figure 2:
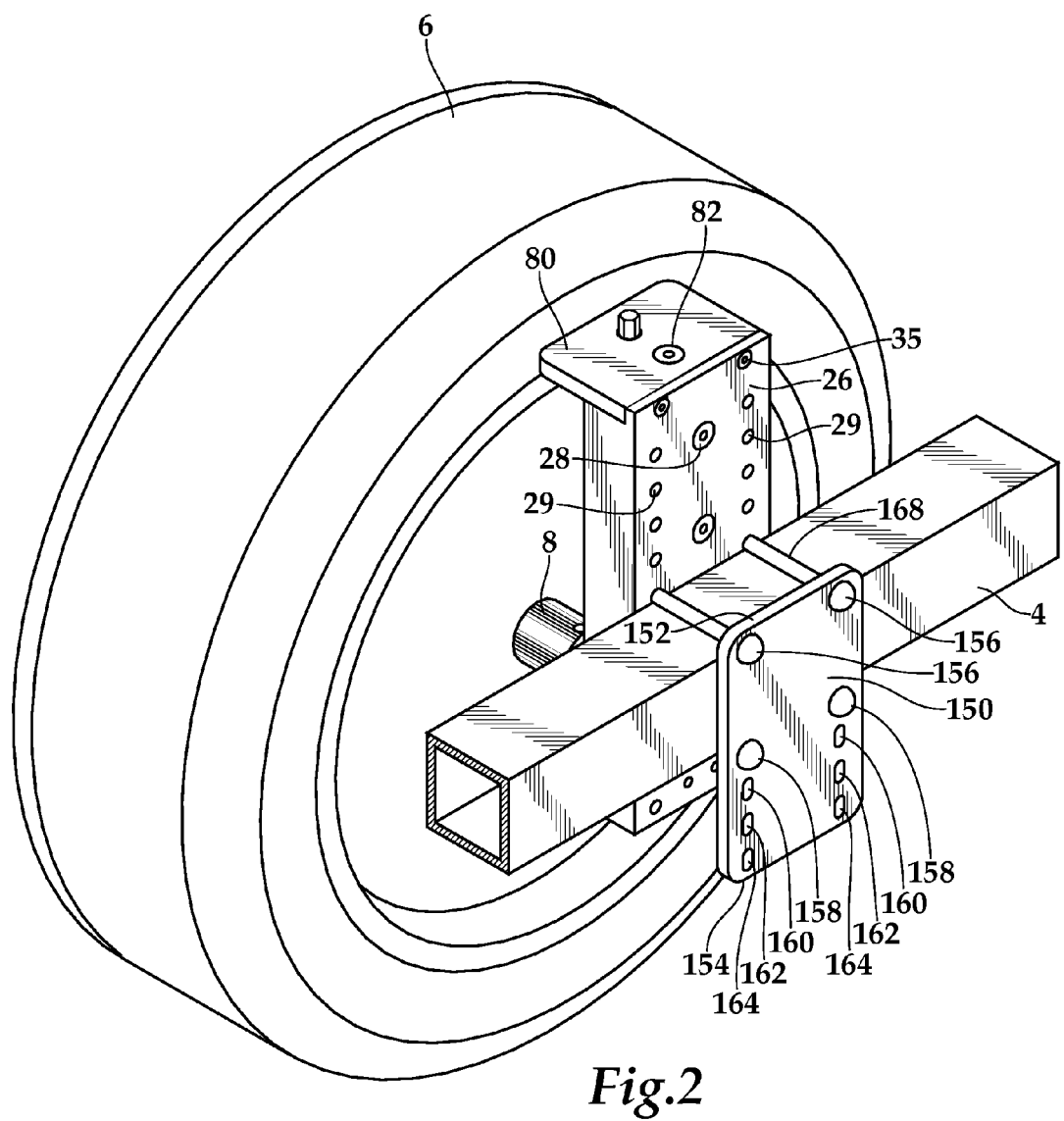
FIG. 2 is an isometric view of a wheel-height adjustable apparatus mounted on a frame member.

Turning to FIG. 2, assembly 10 further may include mounting plate 150 spaced from base 22 for mounting assembly 10 to boat lift frame member 4. Mounting plate 150 may be generally rectangular and may have an inner face similarly shaped to inner face of frame member 4, e.g., both faces may be generally flat. Upper end 152 of mounting plate 150 may include a plurality of first openings 156 for receiving mounting fasteners 168. These fasteners may extend through mounting plate 150, over boat lift frame member 4 and through corresponding second openings 29 in base 22, to be held in place with mounting washers 170 and mounting nuts 172. Similarly, lower end 154 may include a plurality of second openings 158 for receiving additional mounting fasteners 168. These fasteners may be similar to those passing through first openings 156 but instead may pass under boat lift frame member 4. As such, the combination of fasteners above and below boat lift frame member 4 may clamp apparatus 10 to boat lift 2 and restrain movement of apparatus in a direction normal to frame member 4 and preferably also along frame member 4.

Bottoms of first openings 156 and tops of second openings 158 may be spaced apart by a distance generally equal to the height of boat lift frame member 4, e.g., about 3" apart. Alternatively, as shown in FIG. 2, mounting plate 150 may include additional pairs of openings such as third openings 160, fourth openings 162 and fifth openings 164 for allowing mounting plate 150 to be used with frames of varying heights, e.g., up to frame members about 6" tall. Preferably, spacing between openings proximate lower end 154 of mounting plate 150 is substantially equal to spacing between openings comprising second openings 29 on base 22. This spacing may be, e.g., between about ½" and about 2", preferably between about 1" and about 1½", and in one embodiment, about 1⅛".

To use, apparatus 10 may be mounted to boat lift 2 by placing mounting plate 150 against inner surface of boat lift frame member 4, outer surface 26 of base 22 against outer surface of frame member 4 with keyway 50, shaft 54 and screw 114 generally normal to frame member 4 and generally hexagonal portion 124 of screw 114 extending generally upward, and fastening base 22 to mounting plate 150 with fasteners 168. Openings in mounting plate 150 may be selected based on the height of frame member 4. Either before or after this, wheel 6 may be attached to apparatus by sliding wheel hub 8 onto axle 128 and securing wheel 6 with washer 144, yielding the configuration shown in FIG. 3. To raise wheel 6 (technically, to lower boat lift 2 with respect to wheel 6 since wheel 6 is resting on a surface), a torque transmitting device such as a socket wrench engages and rotates the generally hexagonal portion, thereby turning screw 114. As exterior threading 116 of screw 114 rotates, it engages interior threading 112 on spindle 106, causing spindle 106, axle 128 and wheel 6 to move translationally, e.g., to the position seen in FIG. 4. Once wheel 6 has been raised sufficiently, frame member 4 or foot 5 of lift 2 will contact ground instead of wheel 6. To lower wheel 6, or raise boat lift 2, screw 114 is rotated in an opposite direction, e.g., to return the wheel to the position of FIG. 3. Once wheel has been lowered sufficiently, frame member 4 or foot 5 will no longer contact ground, and lift 2 may be rolled away.

Because lift 2, including apparatus 10, may be at least partially submerged in water during use, apparatus 10 preferably is made from non-corrosive, non-oxidizing materials to prevent rusting and sediment buildup. For example, most of apparatus 10 may be made of aluminum, such as 6061 aluminum, which is relatively strong yet lightweight. Alternatively, or in addition, steel elements, such as 316 stainless steel, may be included. Likewise, other corrosion resistant materials, such as SAE 863 bronze may be used. Moreover, bushings 76 and 86 may be made of 360 brass or a similar non-corrosive material that will not inhibit rotation of screw 114.

Figure 6:
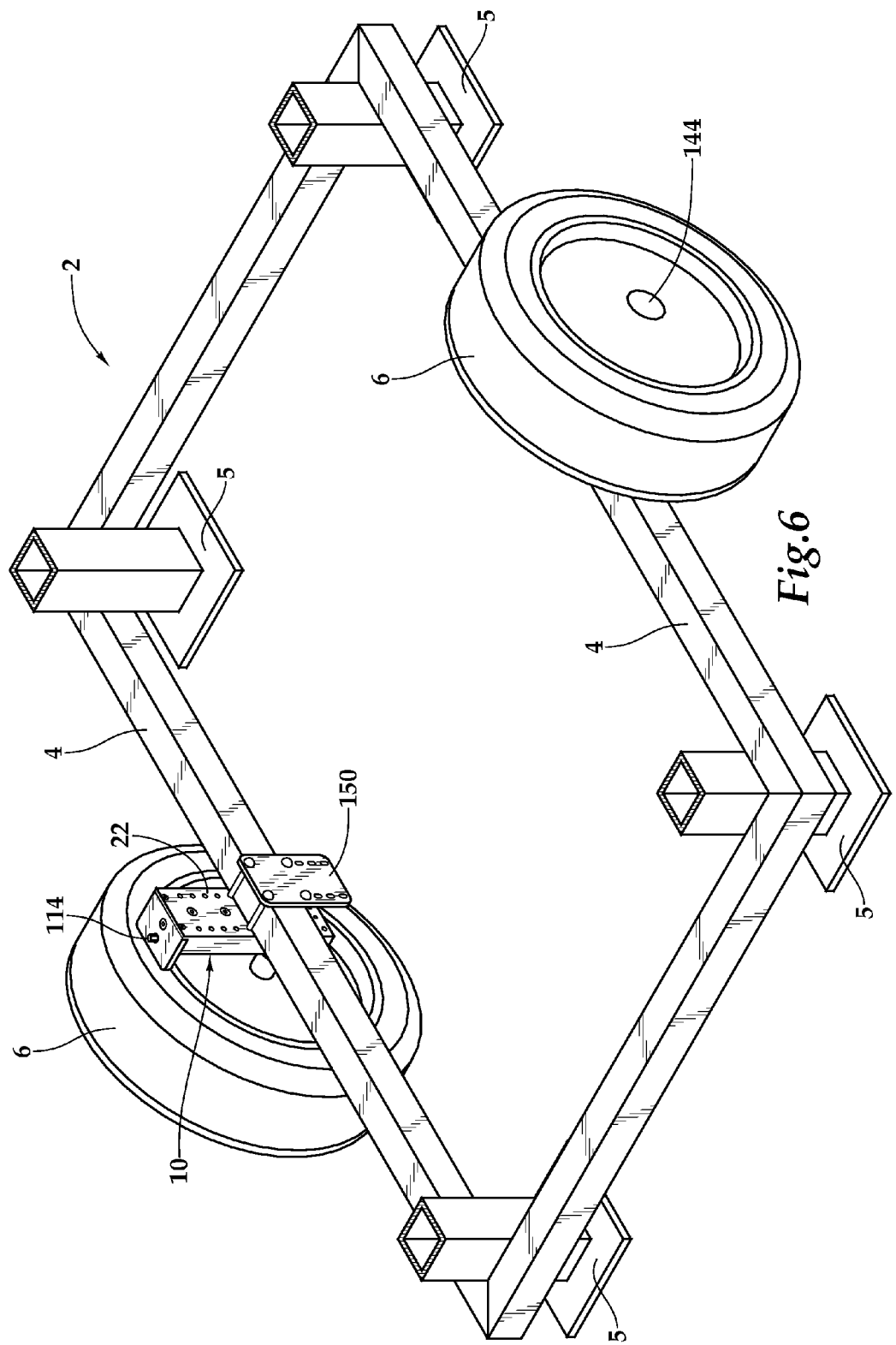
FIG. 6 is an isometric section view of a portion of a lift including a plurality of the apparatus of FIG. 2.

Apparatus 10 may be used individually or in concert with other apparatuses. Preferably an even number of apparatuses are coupled to boat lift 2, on opposite sides of lift 2, to facilitate rolling of lift 2 to a desired position, as seen in FIG. 6.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein.

The invention should therefore not be limited by the above described embodiment and method, but by all embodiments and methods within the scope and spirit of the invention as claimed.

What is claimed is:

1. An apparatus for adjusting the height of a wheel relative to a member, comprising:
   a frame having a base, a first support extending from said base and a second support extending from said base and spaced from said first support;
   a screw extending between said first and second supports, said screw rotatable within said first and second supports, said screw having an end with torque transmitting surfaces for rotating said screw;
   a hub assembly movable between said first and second supports, said hub assembly threadingly engaged with said screw; and
   an axle coupleable to said hub for mounting a tire to said apparatus.

2. An apparatus according to claim 1, further comprising: a shaft coupled to said base, said first support, and said second support and slidably engaged with said hub assembly.

3. An apparatus according to claim 2, further comprising: a keyway coupled to, and positioned between, said base and said shaft.

4. An apparatus according to claim 1, further comprising: a bushing in at least one of said first and second supports, wherein said screw rotatably engages said bushing.

5. An apparatus according to claim 1, wherein said hub assembly includes a hub and a spindle, said hub having a first bore for receiving said screw and a second bore for receiving said spindle, further wherein said spindle includes a bore for receiving said screw.

6. An apparatus according to claim 1, further comprising: a mounting plate spaced from said frame.

7. An apparatus according to claim 6, wherein said mounting plate has a plurality of openings for receiving a first plurality of fasteners and a second plurality of openings for receiving a second plurality of fasteners, and further wherein said first and second pluralities of fasteners removably couple to said base for mounting to said frame member.

8. An apparatus for adjusting the height of a wheel mounted to a member of a boat lift, comprising:
   a frame having a base, a first support and a second support extending generally normal to said base, said base having a plurality of pairs of openings spaced proximate opposite sides of said base;
   a keyway and a shaft, said keyway abutting said base and said shaft coupled to said keyway, said keyway and said shaft extending between said first and second supports along a central plane of said base;
   a screw spaced from said shaft and extending between said first and second supports along a central plane of said base;
   a hub assembly slidably engaged with said keyway and said shaft, and threadingly engaged with said screw;
   said hub assembly including a hub and a spindle at least partially embedded in said hub;
   said hub assembly further including a protrusion at an end of said hub for coupling an axle to said hub assembly; and
   a plate for mounting said base to said member, said member located between said base and said plate.

9. An apparatus according to claim 8, further comprising: a tire rotatably coupled to said axle.

10. An apparatus according to claim 9, wherein said tire has a width substantially equal to a length of said axle.

11. An apparatus according to claim 8, further comprising:
    a plurality of pairs of openings proximate opposing sides of said plate; and
    a plurality of fasteners having shanks sized to pass through said plurality of pairs of openings in said plate and through a respective plurality of pairs of openings in said base.

12. An apparatus according to claim 8, further comprising: a bushing in each of said first and second supports that rotatably engage opposite ends of said screw.

13. An apparatus according to claim 8, said screw having an end with a generally cylindrical portion for engaging a bushing mounted in one of said first and second supports and a generally hexagonal portion having torque transmitting surfaces for rotating said screw.

14. A boat lift comprising:
    a lift frame comprising a plurality of lift frame members, including a plurality of generally parallel members;
    a plurality of wheel frames coupled to said lift frame, wherein at least one wheel frame is coupled to one of said generally parallel members and at least a second wheel frame is coupled to a second one of said generally parallel members;
    each of said wheel frames comprising a screw threadingly engaged with a hub assembly, each hub assembly coupled to an axle supporting a wheel;
    wherein rotating said screw changes a height of a respective wheel relative to a respective wheel frame.

15. A boat lift according to claim 14, wherein said screw has a generally hexagonal portion for engaging a torque transmitting tool.

16. A boat lift according to claim 14, each of said wheel frames further coupled to a shaft, said hub assembly slidable along said shaft.

17. A boat lift according to claim 16, each of said wheel frames and said shafts coupled to a respective keyway, said hub assembly slidable along said keyway.

18. A boat lift according to claim 14, wherein each of said wheel frames comprises a base and a plurality of supports extending generally normal to said base.

19. A boat lift according to claim 18, further comprising a shaft fixedly coupled to said base and said plurality of supports, said hub assembly slidable along said shaft.

* * * * *